United States Patent
Schneider et al.

(10) Patent No.: US 7,878,567 B2
(45) Date of Patent: Feb. 1, 2011

(54) CENTER CONSOLE FOR A MOTOR VEHICLE

(75) Inventors: Andreas Schneider, Calw (DE); Johannes Röcker, Unittlingen (DE); Hannes Rogl, Bad Friedrichshall (DE)

(73) Assignee: Dr. Ing. h.c. F. Porsche Aktiengsellschaft, Stuttgart (DE)

( * ) Notice: Subject to any disclaimer, the term of this patent is extended or adjusted under 35 U.S.C. 154(b) by 100 days.

(21) Appl. No.: 12/422,365

(22) Filed: Apr. 13, 2009

(65) Prior Publication Data

US 2009/0256376 A1 Oct. 15, 2009

(30) Foreign Application Priority Data

Apr. 11, 2008 (DE) .................. 10 2008 018 321

(51) Int. Cl.
*B60R 7/04* (2006.01)
(52) U.S. Cl. ............... 296/24.34; 296/37.8; 297/411.32
(58) Field of Classification Search .............. 296/24.34, 296/37.8, 37.15; 297/188.14–188.17, 411.21, 297/411.32; 248/118.5
See application file for complete search history.

(56) References Cited

U.S. PATENT DOCUMENTS

| | | | | | |
|---|---|---|---|---|---|
| 4,934,750 | A | * | 6/1990 | Eichler et al. | 296/37.8 |
| 5,280,848 | A | * | 1/1994 | Moore | 224/282 |
| 5,845,965 | A | * | 12/1998 | Heath et al. | 297/188.19 |
| 6,007,155 | A | * | 12/1999 | Hara et al. | 297/463.2 |
| 6,010,193 | A | * | 1/2000 | Hara et al. | 297/411.35 |
| 6,045,173 | A | * | 4/2000 | Tiesler et al. | 296/37.8 |
| 6,419,314 | B1 | * | 7/2002 | Scheerhorn | 297/188.19 |
| 6,719,367 | B2 | * | 4/2004 | Mic et al. | 297/188.19 |
| 6,802,550 | B1 | * | 10/2004 | Griggs et al. | 296/24.34 |
| 7,029,049 | B2 | * | 4/2006 | Rockafellow et al. | 296/37.8 |
| 7,163,248 | B2 | * | 1/2007 | Adams et al. | 296/24.34 |
| 7,614,674 | B2 | * | 11/2009 | Shiono et al. | 296/24.34 |
| 7,731,258 | B2 | * | 6/2010 | Bazinski et al. | 296/37.8 |
| 7,766,408 | B2 | * | 8/2010 | Lota et al. | 296/37.1 |
| 7,770,953 | B2 | * | 8/2010 | Koarai | 296/24.34 |
| 2003/0107228 | A1 | | 6/2003 | Ono et al. | |
| 2007/0132284 | A1 | * | 6/2007 | Ekladyous et al. | 297/188.17 |

(Continued)

FOREIGN PATENT DOCUMENTS

DE 3807880 A1 9/1989

(Continued)

OTHER PUBLICATIONS

German Search Report dated Jan. 14, 2009.

*Primary Examiner*—Jason S Morrow

(57) ABSTRACT

A center console for a motor vehicle has a basic body between the front seats with an upwardly open storage compartment over which a support part having an armrest which is displaceable with respect thereto is arranged. The armrest is displaceable from a pushed-back position between the front seats in the direction of the dashboard into a front position, wherein the support part is mounted pivotably on the basic body. The locking mechanism is provided with an actuating element via which, by an different actuation, a pivoting movement of the armrest together with the support part and a displacement movement of the armrest relative to the support part can be released. The locking mechanism is configured such that it permits a pivoting movement of the armrest together with the support part exclusively if the armrest is in its completely pushed-back position.

10 Claims, 5 Drawing Sheets

U.S. PATENT DOCUMENTS

| | | | |
|---|---|---|---|
| 2007/0262632 A1* | 11/2007 | Cody et al. | 297/411.35 |
| 2009/0206647 A1* | 8/2009 | Wieczorek et al. | 297/411.37 |
| 2009/0278370 A1* | 11/2009 | DePue | 296/24.34 |
| 2010/0156129 A1* | 6/2010 | Evans et al. | 296/24.34 |
| 2010/0207414 A1* | 8/2010 | Tsuda et al. | 296/37.8 |

FOREIGN PATENT DOCUMENTS

| | | |
|---|---|---|
| DE | 4309620 C2 | 1/1995 |
| DE | 10000284 A1 | 7/2001 |
| JP | 6099775 A | 4/1994 |

\* cited by examiner

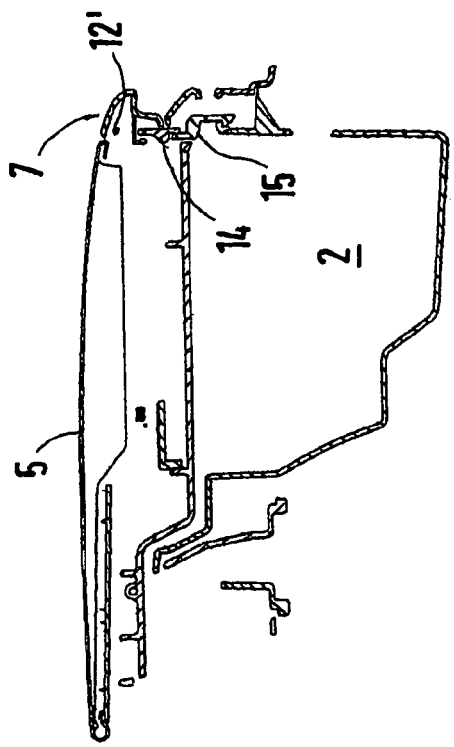
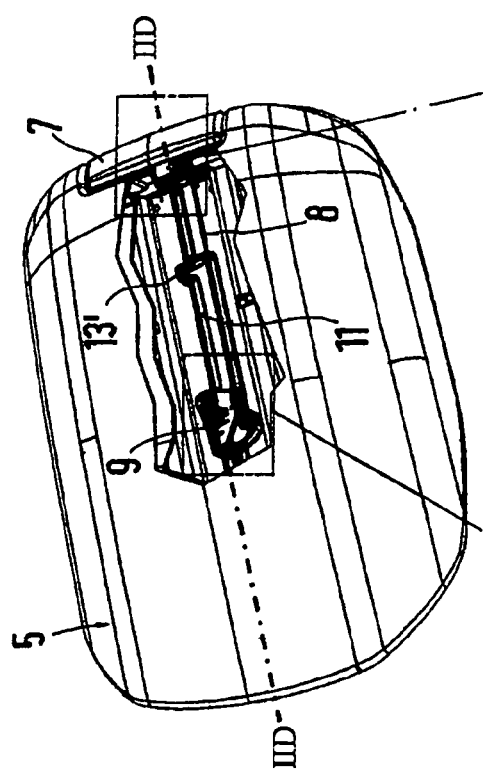
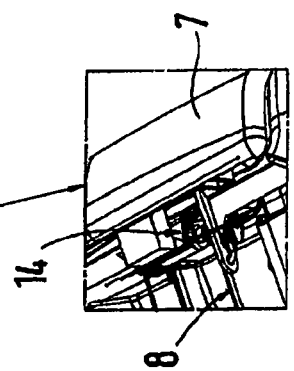
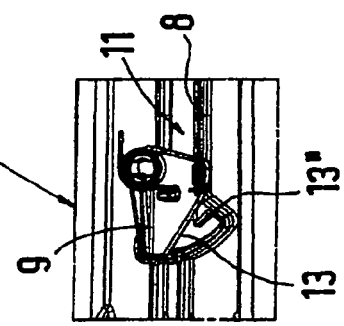

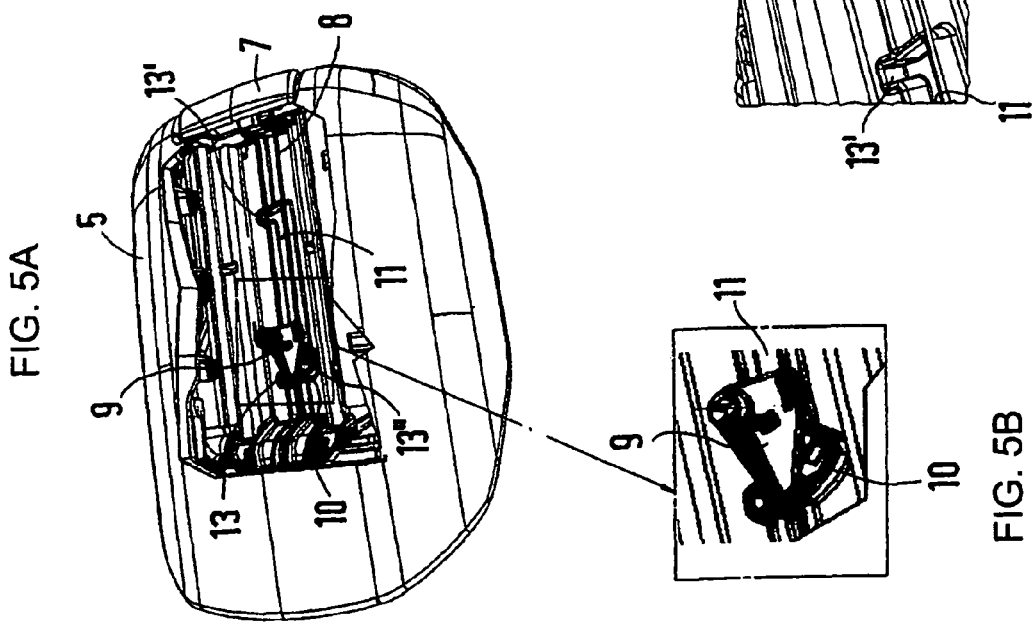
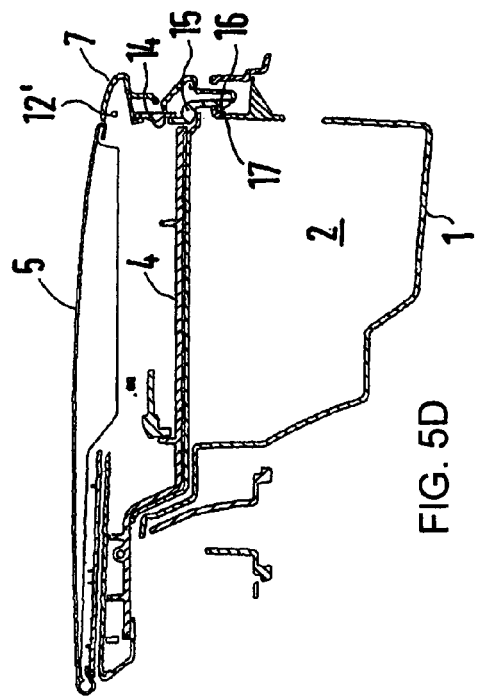
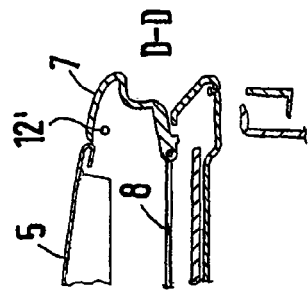
FIG. 5A  FIG. 5B  FIG. 5C  FIG. 5D  FIG. 5E

CENTER CONSOLE FOR A MOTOR VEHICLE

CROSS-REFERENCE TO RELATED APPLICATION

This application claims the priority, under 35 U.S.C. §119, of German application DE 10 2008 018 321.0, filed Apr. 11, 2008; the prior application is herewith incorporated by reference in its entirety.

BACKGROUND OF THE INVENTION

Field of the Invention

The present invention relates to a center console for a motor vehicle. The center console contains a basic body disposed between the front seats with an upwardly open storage compartment. Over the basic body is disposed a support part which has an armrest which is displaceable with respect thereto. The armrest is displaceable from a pushed-back position between the front seats in the direction of the dashboard into a front position, wherein the support part is mounted pivotably on the basic body. The invention also relates to a motor vehicle equipped with a center console of this type.

Published German patent application DE 38 07 880 A1, corresponding to U.S. Pat. No. 4,934,750, discloses a center console of the type in question for a motor vehicle. The center console has a basic body with an upwardly open storage compartment, wherein the opening thereof can be covered by a pivotably coupled covering part. An armrest is mounted in a longitudinally displaceable manner on the covering part, which is customarily also called a support part, and can be transferred from a pushed-back position between the front seats in the direction of the dashboard into a front armrest position. By use of the support part which supports the armrest, the opening in the storage compartment remains covered even when the armrest is completely pushed forward in the direction of the dashboard.

By contrast, German patent DE 43 09 620 C2 discloses a fastening arrangement for a storage compartment of a motor vehicle, with a pivotably coupled cover which covers the storage opening. A storage tray is arranged in the storage compartment, the storage tray is accessible by the cover being pivoted upward, or being lockable to the cover by a fastener and being pivotable. The cover and the storage tray can be locked to the storage compartment by an additional fastener in each case. In this case, in the locked position, the fastener between the cover and storage tray causes the fastener between the storage tray and storage compartment to be released. In order, when the cover is pivoted upward together with the storage tray, to prevent it being possible that release of the fastener between the two parts can be triggered, a swinging mass is coupled pivotably in a locking system and, during the upward pivoting movement, immovably blocks the fastener.

Furthermore, published non-prosecuted German patent application DE 100 00 284 A1 discloses a fastening device for a container with a first, flap-shaped cover which is configured as a container itself and can be closed by a second flap-shaped cover, wherein the pivot axes of the flap-shaped covers which are arranged one above the other are located on the same side. In order for the fastening device here to only require a single actuating element to open the two covers and at the same time to ensure that, when one cover is opened, the other cover in each case remains locked and cannot be opened, the fastening device is arranged on the first cover. A lever which can be pivoted from a central position in two directions is provided as the actuating element. Upon pivoting in the one direction, the first cover is released while, by a pivoting movement in the opposite direction, the second cover is released. In general, however, the entire fastening device in this case is configured in an extremely complicated manner.

SUMMARY OF THE INVENTION

It is accordingly an object of the invention to provide a center console for a motor vehicle which overcomes the above-mentioned disadvantages of the prior art devices of this general type, which is an improved embodiment with increased functionality.

With the foregoing and other objects in view there is provided, in accordance with the invention, a center console for a motor vehicle. The center console contains a basic body having an upwardly open storage compartment and is disposed between front seats. A cover having a support part with an armrest is disposed over the basic body. The armrest is displaceable with respect to the supporting part. The armrest is displaceable from a pushed-back position between the front seats in a direction of a dashboard into a front position. The support part is mounted pivotably on the basic body. A locking mechanism having an actuating element via which, by a different actuation, a pivoting movement of the armrest together with the support part and a displacement movement of the armrest relative to the support part can be released. The locking mechanism is configured such that the locking mechanism permits a pivoting movement of the armrest together with the support part exclusively if the armrest is in the pushed-back position.

The invention is based on the general concept, in the case of a center console of a motor vehicle with a cover which can be pivoted up and which is configured at the same time as an armrest and is mounted displaceably in the longitudinal direction of the vehicle, of providing a locking mechanism which has just a single actuating element with which both functions of the cover and of the armrest, i.e. both the pivoting and the displacement function thereof, can be released. In contrast to known solutions, in which different actuating elements have had to be actuated in each case for the displacement function and the pivoting function, the handling can thus be significantly simplified. According to the invention, the locking mechanism is furthermore configured in such a manner that it permits a pivoting movement of the armrest together with a support part which supports the latter exclusively if the armrest is in its completely pushed-back position. The armrest can generally be displaced between the pushed-back position between the front seats of the motor vehicle in the direction of the dashboard into a front position such that the armrest can be matched to the individual requirements of the driver. The armrest in this case is mounted pivotably via the support part on a basic body of the center console which contains an upwardly open storage compartment. Since a "cup-holder" is customarily arranged in front of the storage compartment, as seen in the direction of travel, it is extremely advantageous, in order to avoid collisions which may occur with a drink container deposited in the cup-holder, for example if the armrest is folded down into its state in which it is pushed forward, if the pivoting movement of the armrest together with the support part is possible only in the situation in which the armrest is in its completely pushed-back position and, as a result, does not project into the region of the cup-holder. With a locking mechanism configured in such a manner, knocking over a drink container deposited in the cup-holder by inadvertent downward pivoting of the armrest together with the support part as the armrest is pushed forward at the same time can therefore be effectively prevented. The center console according to the invention therefore facilitates the operation of the pivoting and displacement function of the armrest and also protects a container deposited in the cup-holder from being inadvertently knocked over.

According to an advantageous development of the solution according to the invention, two linear guide rails which are configured in a complementary manner with respect to each other and together form a guide channel for bearing balls are provided on the support part and on the cover. The cover is therefore mounted on the support part via ball bearings, as a result of which a particularly smooth-running mounting can be achieved. At the same time, a ball bearing of this type constitutes a particularly wear-resistant mounting which is not subject to virtually any wear under customary use conditions and, as a result, a particularly smooth-running mounting of the cover with regard to the support part is obtained over the entire lifetime. In contrast to other types of mounting, for example a mounting by rails and runners engaging therein, a ball bearing of this type also constitutes a mounting which is virtually free from clamping, and therefore jamming can be reliably excluded.

In a further advantageous embodiment of the solution according to the invention, a spring device for the force-assisted opening and closing of the cover is provided. This can be conceived in particular as meaning automatic opening by the spring device after the unlocking mechanism is released, as a result of which access to the center-console storage compartment arranged below the cover can be facilitated, in particular, can be made extremely convenient. At the same time, a spring device configured in such a manner avoids a manual opening movement which can be ergonomically difficult to carry out and is difficult in particular for older or physically disabled people. With the spring device according to the invention, all that is therefore needed to release the locking mechanism is an actuation of the actuating element, whereupon the cover automatically pivots upward and opens up thereunder the storage compartment which was still closed by it. In this case, the spring device can optionally be coupled to a damping device which in particular damps an opening movement of the cover. A spring device without such a damping device would cause an abrupt snapping open, i.e. an abrupt opening of the cover, after the locking mechanism is released while, with the use of the damping device, a damped, in particular uniform opening movement of the cover can be obtained. An opening movement damped in such a way is perceived as a sign of high quality by the customer and can already be found in many pivoting elements which are equipped with a spring device, in particular in the higher price vehicle segment.

It goes without saying that the features mentioned above and those which have yet to be explained below can be used not only in the respectively stated combination, but also in different combinations or on their own without departing from the scope of the present invention.

Other features which are considered as characteristic for the invention are set forth in the appended claims.

Although the invention is illustrated and described herein as embodied in a center console for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE SEVERAL VIEWS OF THE DRAWING

FIG. 2A is a diagrammatic, perspective view of the armrest which is locked with regard to its longitudinal displaceability and its pivotability;

FIG. 2B is an enlarged view of a detail of the locking mechanism of FIG. 2A;

FIG. 2C is an enlarged view of a detail of an actuating element of FIG. 2A;

FIG. 2D is a sectional view taken along the line IID-IID shown in FIG. 2A;

FIG. 5A is a diagrammatic, perspective, partially cut-away view of the armrest which is completely in the pushed-back position and is also released with regard to its longitudinal displaceability, with the pivotability of the armrest being blocked;

FIG. 5B is an enlarged view of the locking mechanism shown in FIG. 5A;

FIG. 5C is an enlarged view of the actuating element shown in FIG. 5A;

FIG. 5D is a sectional view of the armrest according to FIG. 5A; and

FIG. 5E is a sectional view taken along the line VD-VD shown in FIG. 5C.

DETAILED DESCRIPTION OF THE INVENTION

Figure 1C:
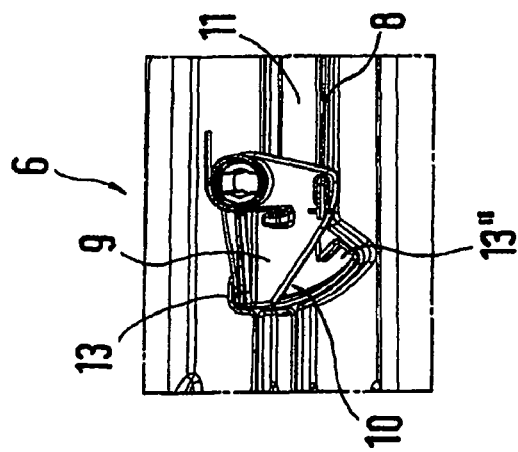
FIG. 1C is a diagrammatic, top plan view of a locking mechanism.
Figure 1B:
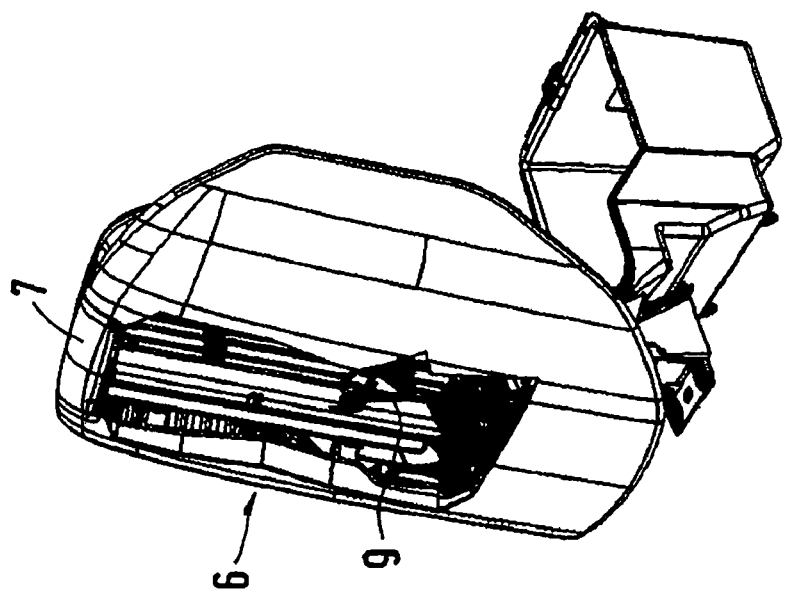
FIGS. 1A and 1B are diagrammatic, perspective, partially cut-away views of a storage compartment for a center console of a motor vehicle with a cover being open and with an armrest at a same time in its completely pushed-back position.
Figure 1A:
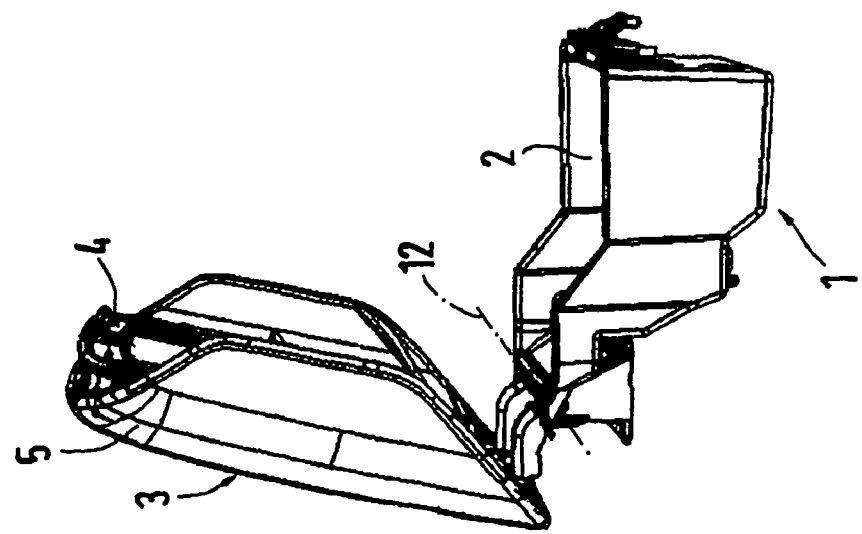

Referring now to the figures of the drawing in detail and first, particularly, to FIGS. 1A-1C thereof, there is shown a storage compartment 2 which is arranged in a basic body 1 and is customarily arranged in a non-illustrated center console between front seats of a motor vehicle. In this case, the storage compartment 2 is open upward and can be closed via a cover 3 which is coupled pivotably to the basic body 1. The cover 3 is generally composed of a support part 4 with an armrest 5 which is displaceable with regard to the support part 4. The armrest 5 can be displaced between a completely pushed-back position and a position displaced completely in the direction of travel toward a non-illustrated dashboard (see FIG. 3A). It is important for the invention in this case that a locking mechanism 6 is provided with an actuating element 7 via which, by a different actuation, both a pivoting movement of the cover 3, i.e. a pivoting movement of the armrest 5 together with the support part 4, and a displacement movement of the armrest 5 relative to the support part 4 can be released.

In this case, a pivoting movement of the armrest 5 together with the support part 4, i.e. an opening and a closing of the cover 3, are exclusively permitted by the locking mechanism 6 configured according to the invention if the armrest 5 is in its completely pushed-back position, as illustrated, for example, according to FIG. 1B.

In general, the locking mechanism 6 contains the actuating element 7 which is operatively connected via a tension element 8, for example a tension rod, to a spring-loaded rotary lever 9. The rotary lever 9 has a guide element 10 which is guided in a corresponding slotted guide mechanism 11 arranged on the support part 4 (see detailed illustrations in FIGS. 1A to 5E). In this case, the guide element 10 can be configured as a conventional guide pin. The slotted guide mechanism 11 extends substantially linearly in a longitudinal direction of the vehicle, i.e. transversely with respect to a pivot axis 12 of the cover 3, with recesses 13 and 13' being provided on each of the longitudinal end sides of the slotted guide mechanism 11, in which recesses the guide element 10 engages in each case when the armrest 5 is completely in its front position or is in its completely pushed-back position. If the guide element 10 of the rotary lever 9 engages here in one of the recesses 13 or 13', then, in this state, both a displacement movement and a pivoting movement of the armrest 5 are blocked. However, as can be gathered from the detailed illustration according to FIG. 1C, the two recesses 13 and 13" are provided at the rear, in the direction of travel, of the slotted guide mechanism 11, with the rotary lever 9 engaging by its guide element 10 in the recess 13. If the actuating element 7 is now only slightly actuated, the guide element 10 is guided out of the recess 13 by a rotational movement of the rotary lever 9 and can slide along in the slotted guide mechanism 11. Although, in this state, a displacement movement of the armrest 5 is possible, opening of the storage compartment 2 is not possible. If, by contrast, the actuating lever 7 is displaced into its second pivoted position, by stronger actuation of the same, this brings about greater rotation of the rotary lever 9, with the guide element 10 engaging in the recess 13". In this state, longitudinal displaceability of the armrest 5 is blocked while a pivoting movement of the armrest 5 is freely possible.

Of course, it is not only possible for the rotary lever 9, but similarly also the actuating element 7, to be acted upon by a spring device.

Figure 3B:
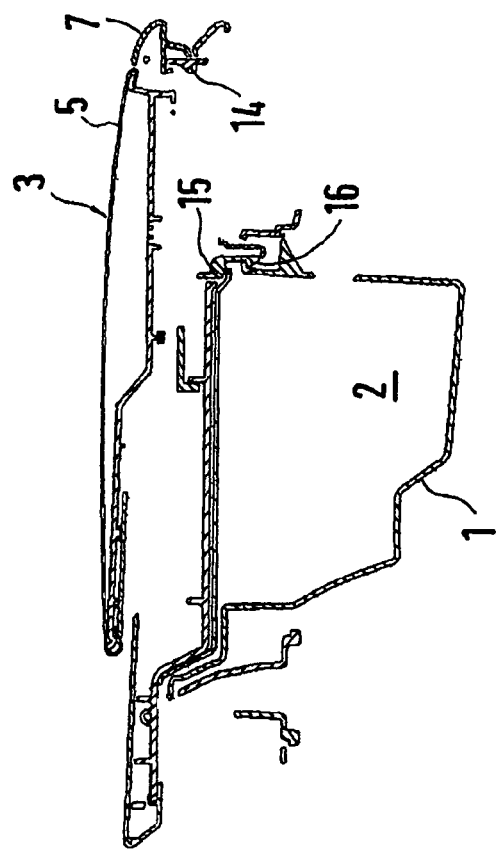
FIG. 3B is a sectional view of the armrest shown in FIG. 3B.
Figure 3A:
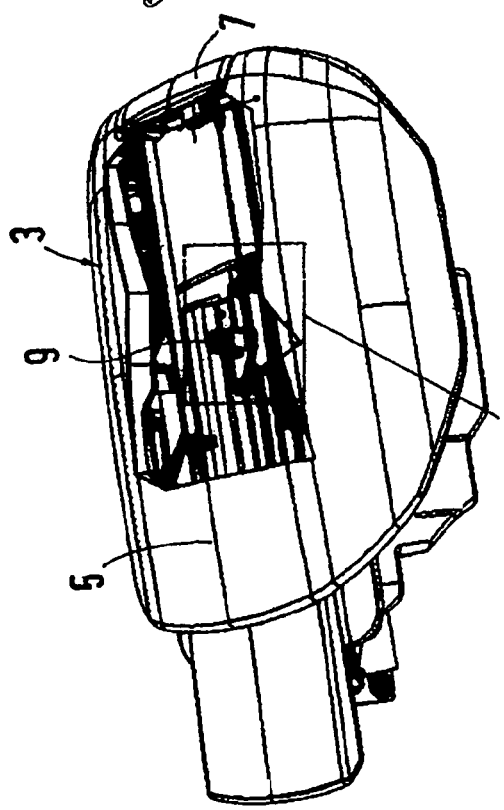
FIG. 3A is a diagrammatic, perspective, partially cut-away view of the armrest which is pushed forward and is locked in this position with the pivotability of the armrest being locked at the same time.
Figure 3C:
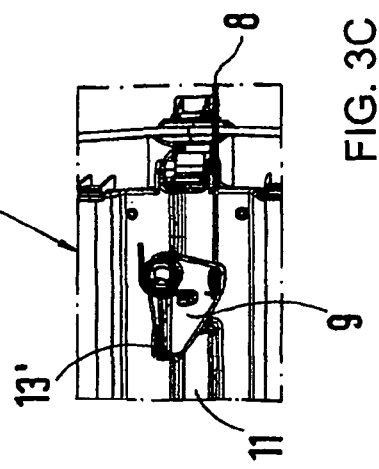
FIG. 3C is an enlarged detail view of the locking mechanism of FIG. 3A.

According to FIGS. 2A-2D, the armrest 5 is in its completely pushed-back position in which the guide element 10 of the rotary lever 9 engages in the recess 13 and, as a result, blocks both longitudinal displaceability of the armrest 5 with respect to the support part 4 and pivotability of the cover 3. By contrast, FIGS. 3A-3C show the armrest 5 in its front position in which it is pushed forward in the direction of the dashboard and in which the guide element 10 of the rotary lever 9 engages in the recess 13', which is located at the front in the direction of travel, and, as a result, blocks the longitudinal displaceability of the armrest 5 with respect to the support part 4. For the moving back, i.e. pushing the armrest 5 to the rear, the actuating element 7 therefore has to be displaced into its first pivoted position in which the guide element 10 of the rotary lever 9 is moved out of the recess 13' and can slide along the slotted guide mechanism 11.

Figure 4C:
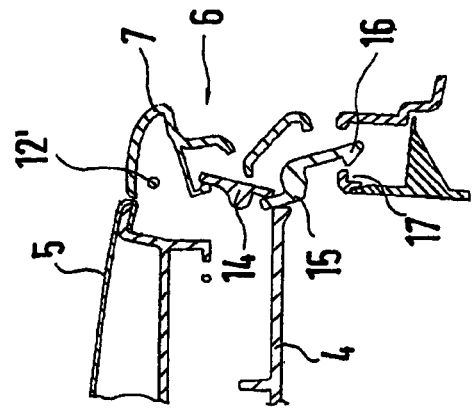
FIG. 4C is a sectional view taken along the line IVC-IVC shown in FIG. 4A.

A position in which the longitudinal displaceability of the armrest 5 with respect to the support part 4 is provided can be gathered, for example, from FIGS. 5A-5E, from which it is apparent, in particular from the detailed illustration, that the guide element 10 of the rotary lever 9 is moved out of the recess 13 and is aligned with the slotted guide mechanism 11. For the pivoting, i.e. for the opening of the cover 3, the armrest 5 now has to be displaced into its completely moved-back position and at the same time the actuating element 7 has to be displaced into its second pivoted position such that the guide element 10 of the rotary lever 9 engages in the recess 13". Such a state is illustrated, for example, according to FIGS. 4A-4C. As can be gathered from the sectional illustration of FIG. 4C, the actuating element 7 acts in the state, in which the cover 3 is released with regard to its pivotability, with a pivotable intermediate lever 14 which is arranged on the cover side and, for its part, is operatively connected to a locking hook 15 on the support part side. In an alternative embodiment, the intermediate lever 14 can be omitted. The actuating element 7 then acts in its second pivoted position directly on the locking hook 15 on the support part side. The direction of rotation of the actuating element 7 and locking hook 15 remain the same (FIG. 4C). The locking hook 15 here has a lug 16 which engages behind an undercut 17, which is formed on the basic body 3, or releases the undercut, in FIG. 4C.

Figure 4B:
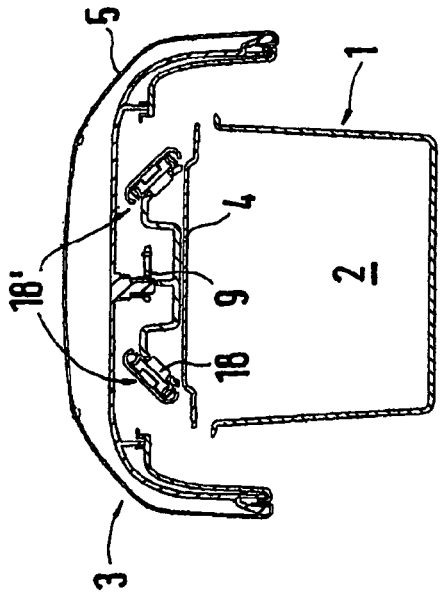
FIG. 4B is a sectional view taken along the line IVB-IVB shown in FIG. 4A.
Figure 4A:
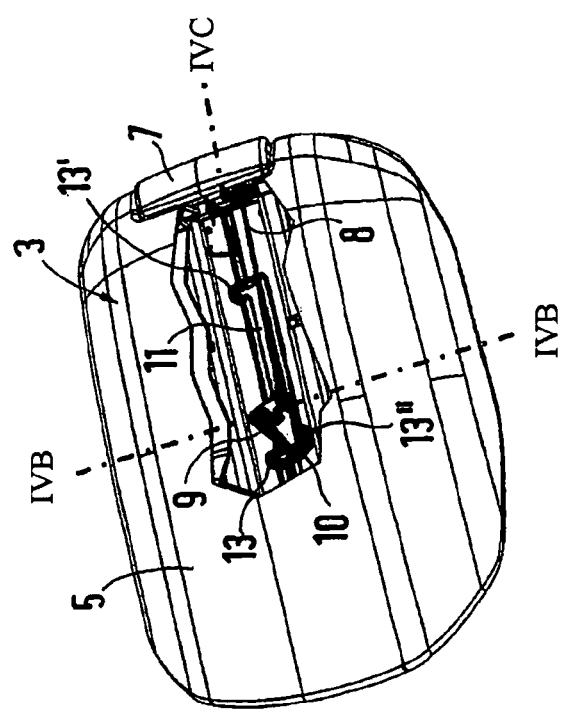
FIG. 4A is a diagrammatic, perspective, partially cut-away view of the armrest in its completely pushed-back and locked position, with the pivotability released at the same time.

The longitudinal displaceability of the armrest 5 with respect to the support part 4 is brought about via two linear guide rails 18 which are arranged on the support part 4 and interact with two guide rails 18' which are arranged on the armrest 5 and are configured in a complementary manner with respect thereto (FIG. 4B). It is conceivable in this case for the two guide rails 18, 18' to together form a guide channel for bearing balls, and therefore the armrest 5 is mounted via a type of ball bearing, i.e. in an extremely smooth-running manner, on the support part 4.

In addition to the locking mechanism 6, an optional spring device for the force-assisted opening of the cover 3 can be provided. A damping device which brings about a damped opening movement of the cover 3 can likewise be provided. The spring device and/or the damping device make(s) it possible to achieve a significant increase in comfort which in particular is also found by the consumer to be extremely agreeable and is considered a feature signifying high quality.

In all of FIGS. 1A to 5E which are shown, the actuating element 7 can be pivoted about an axis 12' which is parallel to the pivot axis 12 of the cover 3, but, of course, a different embodiment of the actuating element 7 will also be covered by the invention. Of course, a type of pushbutton for actuating the locking mechanism 6 is also conceivable.

With the locking mechanism 6 according to the invention it is possible, using one single actuating element 7, to control both a pivoting function and a displacement function of the armrest 5, for which two separate actuating elements were hitherto customarily required.

The invention claimed is:

1. A center console for a motor vehicle, the center console comprising:
   a basic body having an upwardly open storage compartment and disposed between front seats;
   a cover having a support part with an armrest disposed over said basic body, said armrest being displaceable with respect to said supporting part, said armrest being displaceable from a pushed-back position between the front seats in a direction of a dashboard into a front position, said support part being mounted pivotably on said basic body; and
   a locking mechanism having an actuating element via which, by means of different actuation, a pivoting movement of said armrest together with said support part and a displacement movement of said armrest relative to said support part can be released, said locking mechanism configured such that said locking mechanism permits a pivoting movement of said armrest together with said support part exclusively if said armrest is in the pushed-back position.

2. The center console according to claim 1, wherein said locking mechanism has a tension element and a spring-loaded rotary lever with a guide element, said actuating element is operatively connected via said tension element to said spring-loaded rotary lever; and further comprising a slotted guide mechanism disposed on said support part, said guide element of said rotary lever is guided in said slotted guide mechanism.

3. The center console according to claim 2, wherein said slotted guide mechanism has, in each case on longitudinal end sides, recesses formed therein in which said guide element engages when said armrest is completely in the front position or in the pushed-back position, and, in this state, blocks at least a displacement movement of said armrest.

4. The center console according to claim 1, further comprising two linear guide rails which together form a guide channel for bearing balls and are disposed on said support part and on said armrest.

5. The center console according to claim 3, further comprising:

a locking hook disposed on said support part; and a pivotable intermediate lever connected to said actuating element and disposed on said armrest, said pivotable intermediate lever interacting with said locking hook via which said support part is locked to said basic body.

6. The center console according to claim 5, wherein said actuating element is a pivoted lever which, in a first pivoted position, displaces said rotary lever together with said guide element out of one of said recesses on said slotted guide mechanism, while it displaces said locking hook into a release position in a second pivoted position.

7. The center console according to claim 1, further comprising a spring device for a force-assisted opening of said cover.

8. The center console according to claim 1, further comprising a damping device which damps an opening or closing movement of said cover.

9. The center console according to claim 1, wherein said actuating element and said cover are mounted pivotably about parallel axes which run in a transverse direction of the motor vehicle.

10. A motor vehicle, comprising:

a center console, including:

a basic body having an upwardly open storage compartment and disposed between front seats;

a cover having a support part with an armrest disposed over said basic body, said armrest being displaceable with respect to said support part, said armrest being displaceable from a pushed-back position between the front seats in a direction of a dashboard into a front position, said the support part being mounted pivotably on said basic body; and a locking mechanism having an actuating element via which, by means of different actuation, a pivoting movement of said armrest together with said support part and a displacement movement of said armrest relative to said support part can be released, said locking mechanism being configured such that said locking mechanism permits a pivoting movement of said armrest together with said support part exclusively if said armrest is in the pushed-back position.

* * * * *